US009678565B2

(12) United States Patent
Nagai

(10) Patent No.: US 9,678,565 B2
(45) Date of Patent: Jun. 13, 2017

(54) PROJECTOR AND IMAGE DRAWING METHOD

(71) Applicant: Seiko Epson Corporation, Tokyo (JP)

(72) Inventor: Kazuki Nagai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 317 days.

(21) Appl. No.: 13/646,863

(22) Filed: Oct. 8, 2012

(65) Prior Publication Data

US 2013/0093666 A1   Apr. 18, 2013

(30) Foreign Application Priority Data

Oct. 13, 2011   (JP) .................................. 2011-225605

(51) Int. Cl.
| | | |
|---|---|---|
| *G06F 3/01* | (2006.01) | |
| *G06F 3/042* | (2006.01) | |
| *G06F 3/0488* | (2013.01) | |
| *G06K 9/00* | (2006.01) | |

(52) U.S. Cl.
CPC .............. *G06F 3/01* (2013.01); *G06F 3/0425* (2013.01); *G06F 3/04883* (2013.01); *G06K 9/00355* (2013.01); *G06K 9/00409* (2013.01)

(58) Field of Classification Search
None
See application file for complete search history.

(56) References Cited

U.S. PATENT DOCUMENTS

| | | | | | |
|---|---|---|---|---|---|
| 4,964,066 | A | * | 10/1990 | Yamane | ................... G06T 17/00 235/454 |
| 5,528,743 | A | * | 6/1996 | Tou | ......................... G06F 17/25 345/179 |
| 6,687,401 | B2 | * | 2/2004 | Naoi | ..................... G06K 9/6807 382/181 |
| 7,027,651 | B2 | * | 4/2006 | Simon et al. | .................. 382/217 |
| 7,809,193 | B2 | * | 10/2010 | Iwasaki et al. | ............... 382/181 |
| 2007/0025612 | A1 | * | 2/2007 | Iwasaki et al. | ............... 382/154 |
| 2013/0120292 | A1 | * | 5/2013 | Gwak | ................... G06F 3/0416 345/173 |
| 2014/0247209 | A1 | * | 9/2014 | Shimura | ............... G06F 3/0488 345/156 |

FOREIGN PATENT DOCUMENTS

| | | |
|---|---|---|
| JP | H8-160539 A | 6/1996 |
| JP | 9-231393 A | 9/1997 |
| JP | 2008-27080 A | 2/2008 |
| JP | 2009-210625 A | 9/2009 |
| JP | 2010-139685 A | 6/2010 |
| JP | 2010-139899 A | 6/2010 |
| JP | 2011-2650 A | 1/2011 |

* cited by examiner

*Primary Examiner* — Jennifer Mehmood
*Assistant Examiner* — Parul Gupta
(74) *Attorney, Agent, or Firm* — ALG Intellectual Property, LLC

(57) ABSTRACT

A projector includes a recognition section adapted to recognize an image to be drawn and a drawing area in which the image is drawn based on a trajectory of a symbol written to a projection surface, an acquisition section adapted to acquire image data representing the image recognized by the recognition section, and a drawing control section adapted to perform control so that the image represented by the image data acquired by the acquisition section is drawn in the drawing area of the projection surface recognized by the recognition section.

10 Claims, 9 Drawing Sheets

| KEYWORD | FILE PATH |
| --- | --- |
| ANSWER 1 | /file/........./A1.jpg |
| ANSWER 2 | /file/........./A2.jpg |
| ⋮ | ⋮ |

PROJECTOR AND IMAGE DRAWING METHOD

BACKGROUND

1. Technical Field

The present invention relates to a technology for drawing an image corresponding to a content using a projector.

2. Related Art

Some projectors have an interactive function. Here, the interactive function denotes a function capable of drawing a character or the like corresponding to a trajectory of writing operation of the user while being superimposed on the original image having projected by a projector (see, e.g., JP-A-2011-2650 (Document 1)).

The technology described in Document 1 is for displaying a composite image obtained by superimposing lines corresponding to the trajectory of a pointing device on the original image. In the case of using such a technology, the user may have a difficulty when trying to draw an image (or an image difficult to express by handwriting) taking long time to be drawn by handwriting, or a diagram required to have accuracy such as a graph.

SUMMARY

An advantage of some aspects of the invention is to make it possible to display a predetermined image corresponding to the operation by writing on a projection surface using a projector.

A projector according to an aspect of the invention includes a recognition section adapted to recognize an image to be drawn and a drawing area in which the image is drawn based on a trajectory of a symbol written to a projection surface, an acquisition section adapted to acquire image data representing the image recognized by the recognition section, and a drawing control section adapted to perform control so that the image represented by the image data acquired by the acquisition section is drawn in the drawing area of the projection surface recognized by the recognition section.

According to the projector of this aspect of the invention, it is possible to display a predetermined image corresponding to the operation by writing on a projection surface.

In a preferable aspect of the invention, it is possible that the acquisition section acquires the image data and identification information linked with the image data, the recognition section includes a position recognition section adapted to recognize the drawing area, which is designated in the projection surface, based on the trajectory, and an identification information recognition section adapted to recognize the identification information based on the trajectory, and the drawing control section makes the image, which is represented by the image data linked with the identification information recognized by the identification information recognition section, be drawn in the drawing area of the projection surface recognized by the position recognition section.

According to this aspect of the invention, it is possible to display an image corresponding to the identification information.

In another preferable aspect of the invention, it is possible that the identification information includes a predetermined keyword, and the identification information recognition section determines whether or not the keyword is included in the trajectory to thereby recognize the identification information.

According to this aspect of the invention, it is possible for the user to display an image corresponding to a keyword by writing the keyword.

In still another preferable aspect of the invention, it is possible that the position recognition section recognizes a plurality of drawing areas, the identification information recognition section recognizes a plurality of pieces of identification information, and the drawing control section determines a correspondence relationship between the drawing area and the identification information based on one of positions of the drawing area and the identification information, and a number at which the drawing area and the identification information are recognized.

According to this aspect of the invention, it is possible to display a plurality of images represented by a plurality of image data respectively in the desired drawing areas.

In yet another preferable aspect of the invention, it is possible that the identification information includes information representing one of a color and a shape of the trajectory adapted to designate the drawing area, and the identification information recognition section recognizes the identification information based on one of the color and the shape of the trajectory.

According to this aspect of the invention, it is possible to distinguish the display object images based on the color and the shape of the trajectory for designating the drawing area.

In still yet another preferable aspect of the invention, it is possible that the recognition section has a control information recognition section adapted to recognize control information, which is used for controlling reproduction of the image, based on the trajectory, and the drawing control section controls the reproduction of the image with the control information recognized by the control information recognition section.

According to this aspect of the invention, it is possible to control the reproduction state of the image by the writing operation.

In further another preferable aspect of the invention, it is possible that the drawing control section updates the image if a change in the trajectory recognized by the recognition section fulfills a predetermined condition.

According to this aspect of the invention, it is possible to erase or rewrite the image.

An image drawing method according to another aspect of the invention includes recognizing an image to be drawn and a drawing area in which the image is drawn based on a trajectory of a symbol written to a projection surface, acquiring image data representing the image recognized, and drawing the image, which is represented by the image data acquired, in the drawing area recognized of the projection surface.

According to the image drawing method of this aspect of the invention, it is possible to display a predetermined image corresponding to the operation by writing on a projection surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
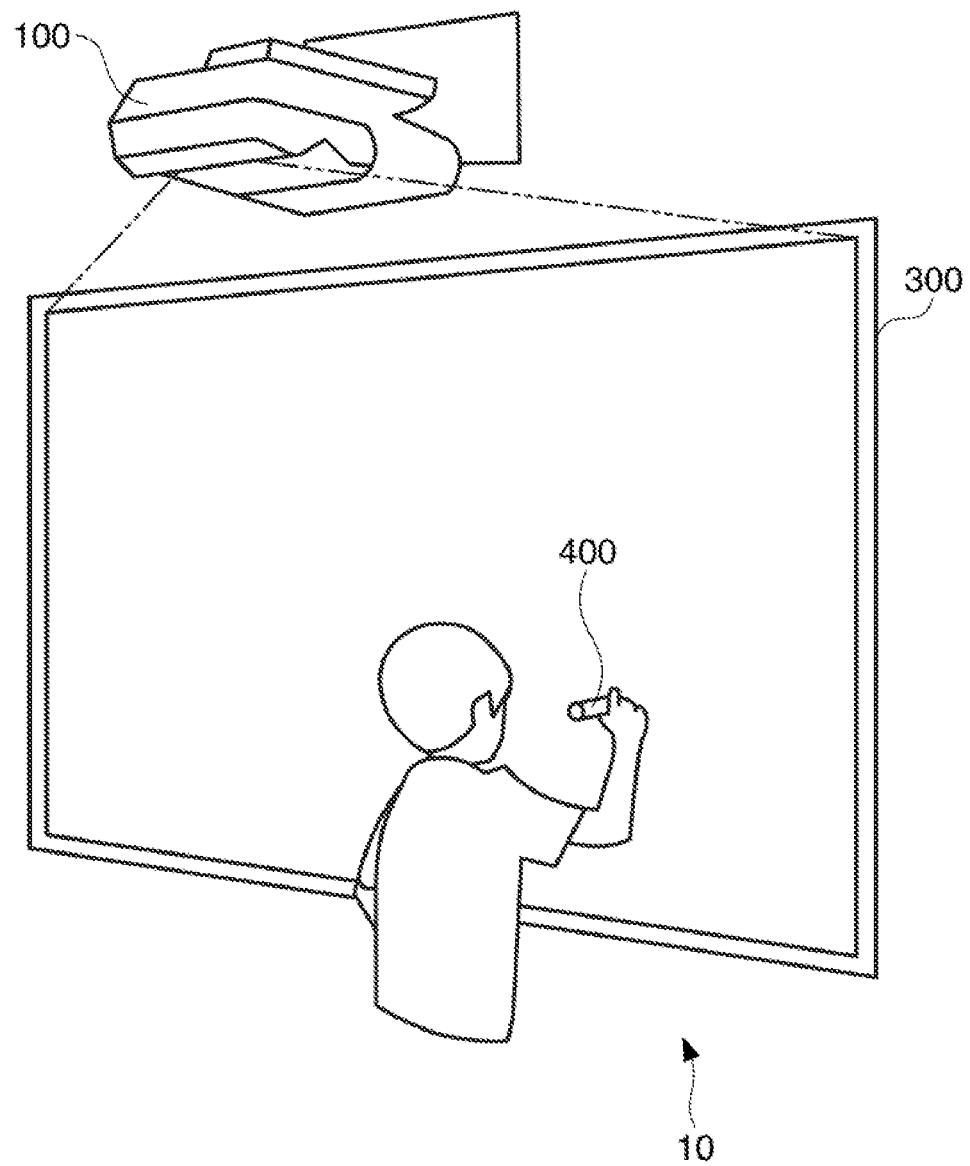
FIG. 1 is a diagram showing an overall configuration of a projection system.

FIG. 1 is a diagram showing an overall configuration of a projection system 10 according to a first embodiment of the invention. The projection system 10 is a so-called interactive projection system, and is a system capable of drawing an image (a still image or a moving image) corresponding to the trajectory of a symbol (a character or a diagram) written by the user. The user is, for example, a teacher who teaches knowledge to a student or a lecturer who gives a lecture to students.

The projection system 10 is provided with a projector 100, a whiteboard 300, and a pen 400. The whiteboard 300 is a plate-like instrument functioning as a projection surface on which an image is projected by the projector 100, and at the same time allowing the user to write a character or a diagram thereon with the pen 400. The pen 400 is an instrument for drawing a trajectory on the whiteboard 300 by attaching a color material (such as ink) thereon. It should be noted that as described later, it is also possible to provide a plurality of pens 400 different in color from each other. Further, the writing by the user can be performed using a stamp with a predetermined character or a diagram impressed thereon instead of the pen 400.

The projector 100 is an electronic apparatus for projecting an image on the whiteboard 300 to thereby display the image. A display element and a light source used in the projector 100 are not particularly limited. Further, although the display method of the projector 100 is also not particularly limited, a pinup type short focus projector is desirably adopted so as not to hinder the writing by the user, or not to generate a lot of shadows of the user on the projection surface. For example, the projector 100 is desirably a device for projecting the image from above the whiteboard 300 as shown in FIG. 1.

Further, the projector 100 has a function of shooting the whiteboard 300. In more detail, the projector 100 shoots the trajectory written on the whiteboard 300 by the user. Although this shooting function is desirably a function (i.e., a function corresponding to a digital video camera) of shooting a moving image, shooting of a still image instead of the moving image is also sufficient if the whiteboard 300 can be shot repeatedly at predetermined timings.

Figure 2:
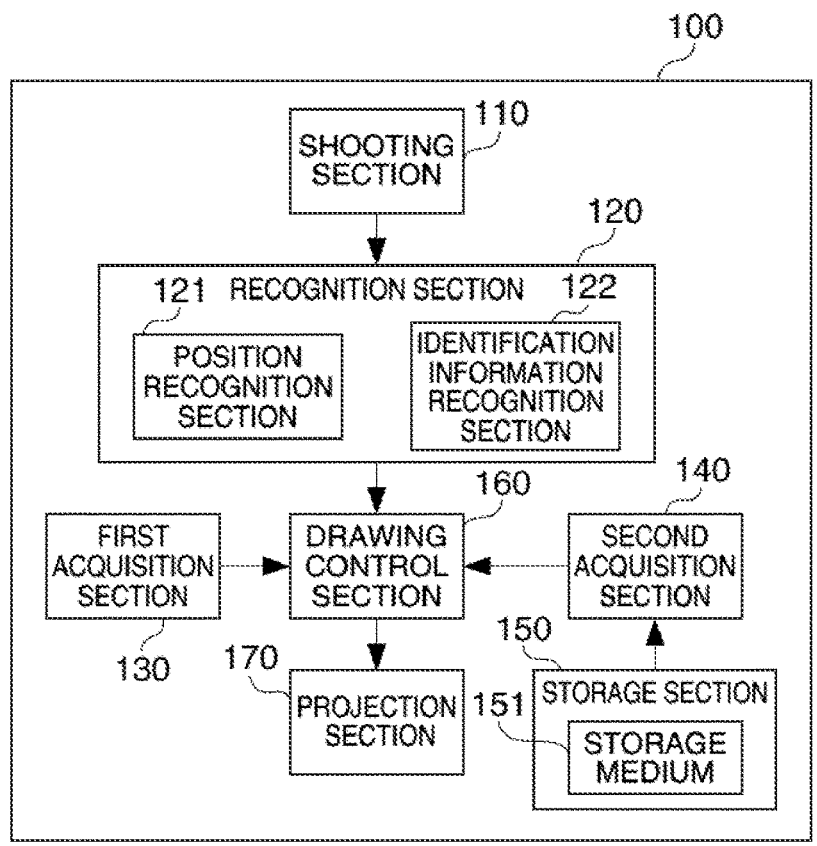
FIG. 2 is a block diagram showing a configuration of a projector.

FIG. 2 is a block diagram showing a more specific configuration of the projector 100. The projector 100 is provided with a shooting section 110, a recognition section 120, a first acquisition section 130, as second acquisition section 140, a storage section 150, a drawing control section 160, and a projection section 170.

The shooting section 110 is a device for shooting the projection surface. The shooting section 110 is provided with an imaging element such as a charge coupled device (CCD) image sensor or a complementary metal oxide semiconductor (CMOS) image sensor, and an image processing circuit for generating image data from a signal supplied from the imaging element, and then outputting the image data. The shooting section 110 supplies the recognition section 120 with the image data.

The recognition section 120 is a device for recognizing the trajectory of a symbol written with the pen 400. The recognition section 120 recognizes the trajectory of the symbol written on the projection surface by the user based on the image data supplied from the shooting section 110. It should be noted here that the symbol denotes a character or a diagram which can be recognized by the recognition section 120. The character mentioned here is not limited to a Kanji character or an alphabet, but a numeric character and a symbol correspond to the character. The recognition section 120 has a function of recognizing these characters and predetermined figures.

The first acquisition section 130 is a device for acquiring a first content representing the original image. The first content is the data including at least the image data (the first image data) representing the original image. In contrast, the second acquisition section 140 is a device for acquiring a second content representing an image (hereinafter also referred to as an "interactive image") displayed in accordance with the trajectory drawn by the user. The second content is the data including at least the image data (the second image data) representing the interactive image.

Here, the content denotes the data including at least the image projected on the projection surface. The content is the data having, for example, the Joint Photographic Experts Group (JPEG) format in the case of the still image, or the Moving Picture Expert Group (MPEG)-2 format in the case of the moving image. Further, the original image denotes the image having been projected before the user performs writing on the projection surface, and the interactive image denotes the image to be projected in accordance with the writing of the user so as to be superimposed on the original image.

The first acquisition section 130 acquires the first content from an external device such as a personal computer by communicating with the external device. In contrast, the second acquisition section 140 acquires the second content stored in the storage section 150, and identification information having correspondence with the content. The storage section 150 is provided with a storage medium 151 (such as a hard desk or a flash memory) for storing the data, and stores the second content described above, and a table (hereinafter referred to as a "content-linking table") describing the correspondence between the second content and keywords as the identification information thereof.

It should be noted that unlike the second content, the first content is not an essential content in the invention. In other words, on the projection surface, it is possible to project the interactive image so as to be superimposed on the original image in the state in which the original image has already been projected, and it is also possible to project only the interactive image in the state in which no original image is displayed. Therefore, the first acquisition section 130 is also not essential for implementation of the invention.

The drawing control section 160 is a device for controlling the drawing of the image corresponding to the content. The drawing control section 160 supplies the projection section 170 with an image signal for projecting the original image, the interactive image, or the composite image obtained by superimposing the original image and the interactive image based on at least either one of the first content and the second content. In the case of projecting the image including the interactive image, the drawing control section 160 operates in accordance with the recognition result obtained by the recognition section 120. Specifically, the drawing control section 160 acquires the second content in accordance with the recognition result obtained by the recognition section 120, and at the same time calculates a drawing position of the interactive image and a magnification ratio when performing the drawing, and then make the interactive image be drawn in accordance with the calculation result.

It should be noted that the recognition section 120, the first acquisition section 130, the second acquisition section 140, and the drawing control section 160 can be realized by a central processing unit (CPU), a memory, an image processing circuit, and so on. These sections can be operated with a single operation subject (e.g., the CPU), or can be operated with a plurality of operation subjects cooperating with each other.

The projection section 170 is a device for projecting the image on the projection surface to thereby display the image. The projection section 170 is provided with, for example, a lamp functioning as a light source, and a liquid crystal panel functioning as a light modulator for modulating the light emitted from the light source, and projects the image on the projection surface by irradiating it with the light modulated in accordance with the image signal supplied from the drawing control section 160. It should be noted that the configuration of the projection section 170 is not limited thereto, but can be the configuration using a display element other than the liquid crystal, or the configuration using any one of the light transmission and the light reflection.

Further, in more detail, the recognition section 120 has a position recognition section 121 and an identification information recognition section 122. The position recognition section 121 is a device for recognizing the position (hereinafter referred to as a "drawing area"), at which the interactive image is drawn, based on the trajectory drawn by the pen 400, and the identification information recognition section 122 is a device for recognizing the interactive image, which should be drawn, based on the trajectory drawn by the pen 400. The position recognition section 121 recognizes a predetermined mark (hereinafter referred to as a "positioning mark") for designating the drawing area from the trajectory by the pen 400 to thereby recognize the drawing area. Further, the identification information recognition section 122 recognizes a character string corresponding to the keyword described later from the trajectory by the pen 400 to thereby recognize the interactive image to be drawn. In the recognition by the identification recognition section 122, the optical character recognition (OCR) technology well known to the public can be used.

Specifically, the recognition section 120 analyzes the image represented by the image data supplied from the shooting section 110 to thereby specify the image corresponding to the trajectory of the pen 400, and then performs the recognition in the identification information recognition section 122 if the image thus specified is a character, or the recognition in the position recognition section 121 if the image thus specified is not a character. In more detail, for example, the recognition section 120 first determines whether or not the image can be recognized as a character, and if it fails to be recognized as a character, then the recognition section 120 determines whether or not the image can be recognized as the positioning mark. It should be noted that the recognition section 120 can also be a section for recognizing the positioning mark first, and then recognizing the keyword as described later. In other words, the order in which the position recognition section 121 and the identification information recognition section 122 perform the recognition can be changed depending on the specific algorithm.

Figure 3:
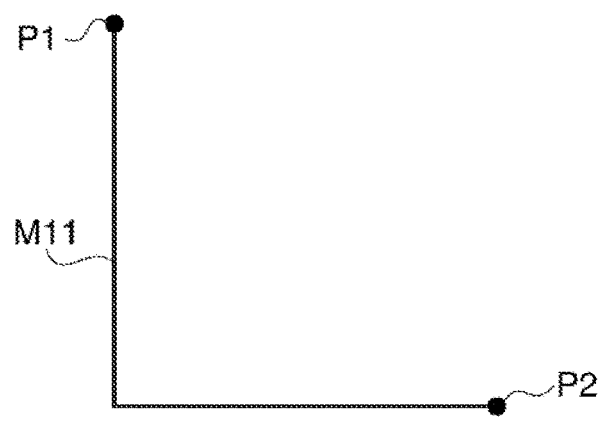
FIG. 3 is a diagram showing an example of a positioning mark.

FIG. 3 is a diagram showing an example of the positioning mark. The positioning mark M11 shown in the drawing is a diagram for designating the boundary of the drawing area, and in this example, defines the upper end and the left end of the drawing area with the point p1 of the diagram shaped like an "L," and defines the lower end and the right end of the drawing area with the position of the point p2 thereof. The positioning mark M11 is actually written by hand, and is therefore not necessarily composed of completely straight lines and is not necessarily provided with the right-angled corner as shown in the drawing. The position recognition section 121 compares the shape of the trajectory by the pen 400 with the shape of the positioning mark determined in advance, and recognizes that the positioning mark is written if these shapes match each other in a proportion higher than a predetermined proportion. Pattern recognition technologies well known to the public can be used in the above recognition.

Figures 4, 5:
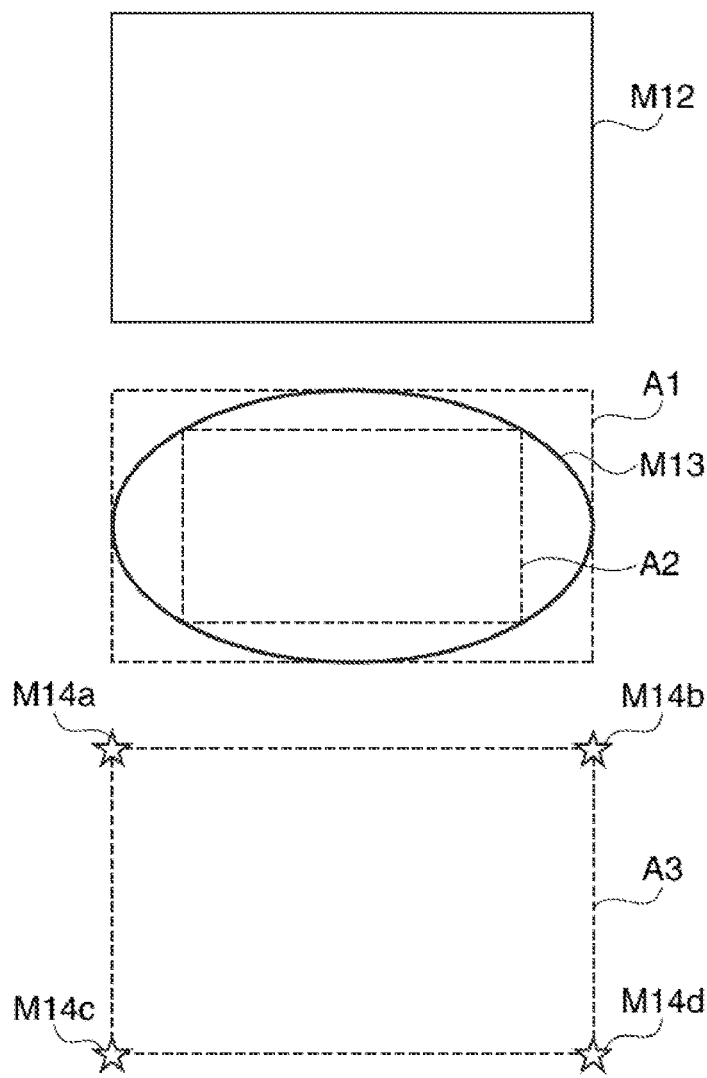
FIG. 4 is a diagram showing examples of a positioning mark.
FIG. 5 is a diagram showing an example of a content-linking table.

FIG. 4 is a diagram showing other examples of the positioning mark. The positioning mark M12 is a rectangular (or a square) diagram, and in this case, the entire inside of the diagram is recognized as the drawing area. Further, the positioning mark M13 is a circular diagram, and in this case, the entire inside of the diagram or either of the rectangles indicated by the dotted lines A1, A2 in the drawing touching the diagram is recognized as the drawing area.

It should be noted that it is also possible to constitute the positioning mark with a combination of a plurality of diagrams instead of a single diagram. The positioning marks M14a, M14b, M14c, and M14d are for indicating the drawing area A3, which is indicated by the dotted lines, using the positions of the vertexes.

As described above, the positioning mark can be any diagram providing the diagram is determined in advance.

FIG. 5 is a diagram showing an example of the content-linking table. As shown in the drawing, the content-linking table is a table having file paths of the second contents and the keywords thereof linked with each other. It should be noted that the file path mentioned here is the information representing the location of the second content, but can be substituted with a mere file name depending on the directory structure and so on of the storage medium 151.

The configuration of the projection system 10 is as described above. Under the configuration, the user offers oral explanations and writes the symbols on the whiteboard 300. On this occasion, the user can write symbols other than the positioning mark and the keyword on the whiteboard 300. The projector 100 shoots the whiteboard 300 at an appropriate timing, and then generates the image data. When the image data thus generated is analyzed, and then a predetermined condition is fulfilled, the projector 100 draws the interactive image on the projection surface. It should be noted that it is assumed that the projector 100 is set to the operable state by, for example, being powered on in advance.

Figure 6:
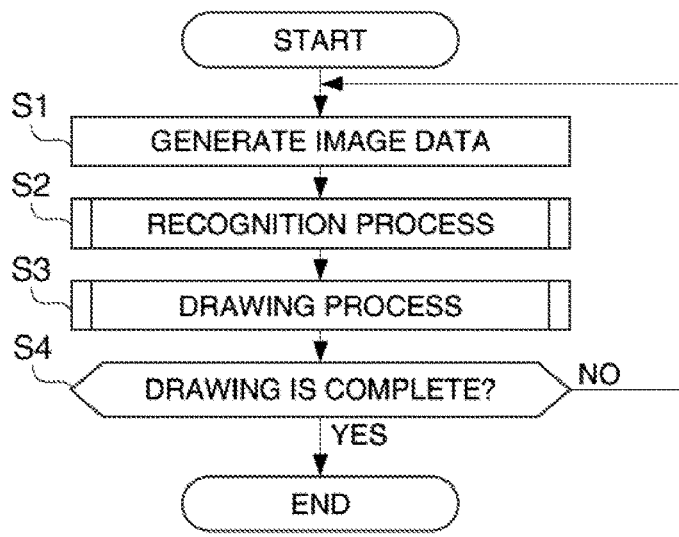
FIG. 6 is a flowchart showing a process executed by the projector.

FIG. 6 is a flowchart showing a process of the projector 100 related to the drawing of the interactive image. In this process, the projector 100 firstly shoots the whiteboard 300 to thereby generate (step S1) the image data, and then executes (step S2) the recognition process for recognizing the positioning mark or the keyword from the trajectory drawn by the user. Subsequently, the projector 100 executes (step S3) the drawing process for drawing the interactive image. Subsequently, the projector 100 determines (step S4) whether or not the drawing is to be terminated, and if the drawing is not terminated, the processes on and after the step S1 are repeated. It should be noted that the determination in the step S4 is performed based on, for example, an event that the projector 100 is powered off, or a specific operation by the user.

It should be noted that as a coordinate system which the projector 100 can use when recognizing the image, any coordinate system can be used providing the coordinate system taking the pixels of the image data as the reference (or the coordinate system taking the coordinate of the whiteboard 300 as the reference) and the coordinate system taking the pixels used by the projector 100 for the projection as the reference are both considered. It should be noted that in the present embodiment the two-dimensional Cartesian coordinate system defining the horizontal direction of the whiteboard 300 as the X axis and the vertical direction thereof as the Y axis is used as the coordinate system.

Figure 7:
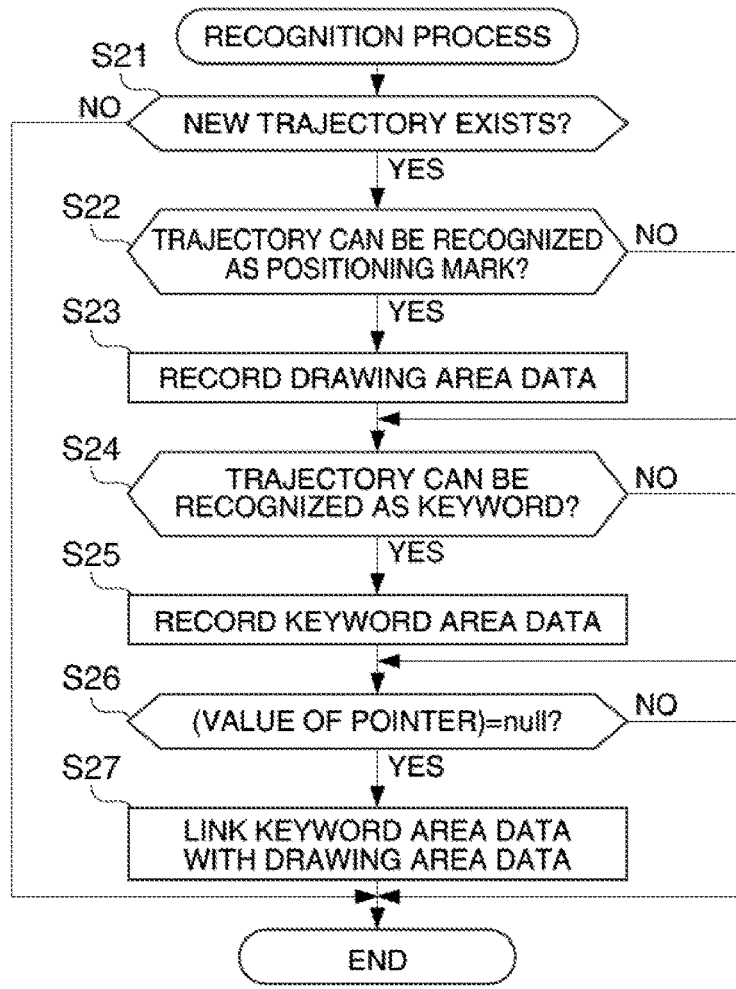
FIG. 7 is a flowchart showing a recognition process.

FIG. 7 is a flowchart specifically showing the recognition process of the step S2. In the recognition process, the projector 100 determines (step S21) whether or not a newly added trajectory exists in the image represented by the image data received. The determination is performed by extracting the difference between the latest one of the image data received and the image data received prior to the latest image data. Specifically, if a significant difference exists between the images represented by the two image data, the projector 100 extracts the difference, and defines the difference as the newly added trajectory.

Then, the projector 100 determines (step S22) whether or not the trajectory (i.e., the newly added trajectory) extracted in such a manner can be recognized as the positioning mark. On this occasion, by comparing the trajectory thus extracted and the positioning mark determined in advance with each other, the projector 100 determines whether or not the trajectory corresponds to the positioning mark.

It should be noted that the positioning mark might be misidentified as a character depending on the shape thereof. For example, there is a possibility that the positioning mark M11 shown in FIG. 3 is misidentified as an "L". Further, the positioning mark M12 shown in FIG. 4 might be misidentified as "a rectangle corresponding to No. 81A0 of SHIFT_JIS code" of a symbol. In order to prevent the misidentification described above, it is possible to provide difference in size between the positioning marks and the characters (the keyword), and to set the rule of regarding the trajectory having a size equal to or larger than a predetermined threshold value as the positioning mark, and determining that the trajectory smaller in size than the predetermined threshold value is a character, for example.

It should be noted that the size of the character varies between individuals due to the custom, the preference, and so on, and can be different between the users. Therefore, it is desirable that the threshold values here are arranged to be able to be set by the individual user. The device for setting the threshold values can be realized by, for example, providing the projector 100 with a button to thereby receive the operation of the user. Alternatively, the device for setting the threshold values can be the device for making the user write one or several characters on the whiteboard 300 in advance before executing the recognition process, then determining the size of the character based on the image data obtained by shooting the whiteboard 300, and then setting the threshold values (on the projector 100 side) taking the size of the character as the reference.

After the positioning mark has successfully been recognized in such a manner as described above, the projector 100 generates the drawing area data based on the positioning mark thus recognized, and then records (step S23) the drawing area data. In contrast, in the case in which the positioning mark has failed to be recognized, the projector 100 skips (eliminates) the process of the step S23, and then executes the subsequent process. The drawing area data is the data for linking the drawing area and the interactive image drawn in the drawing area with each other.

Figure 8:
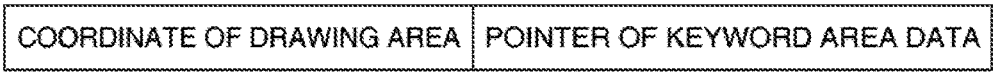
FIG. 8 is a diagram showing a data structure of drawing area data.

FIG. 8 is a diagram showing a data structure of the drawing area data. The drawing area data is the data having the coordinates of the drawing area and the pointers for looking up the keyword area data representing the keyword corresponding to the drawing area in correspondence with each other. The coordinates of the drawing area in the case in which, for example, the drawing area has a rectangular shape denotes the coordinates of the four vertexes thereof. The pointer is the data representing the location on the memory where the keyword area data is stored. It should be noted that it is assumed that the initial value of the pointer is "null," namely the value to which nothing is defined.

Figure 9:
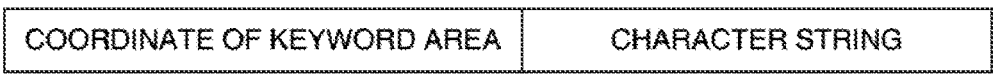
FIG. 9 is a diagram showing a data structure of keyword area data.

Further, FIG. 9 is a diagram showing a data structure of the keyword area data. The keyword area data is the data having the coordinates of the area (hereinafter referred to as the "keyword area") where the keyword is recognized and the character string recognized as the keyword in correspondence with each other. The keyword area denotes the area defined so as to include the entire character string recognized as the keyword, and is typically a rectangular area. The keyword area is appropriately defined in accordance with the actual size of the character string recognized as the keyword, but is preferably prevented from increasing beyond necessity compared to the size of the character string.

After generating the drawing area data described above, or skipping this process, the projector 100 determines (step S24) whether or not the newly added trajectory can be recognized as the keyword. If the keyword can be recognized, the projector 100 generates the keyword area data, and then records (step S25) the keyword area data. Further, the projector 100 skips the process of the step S25 if the keyword has failed to be recognized.

Subsequently, the projector 100 determines (step S26) whether or not the drawing area data with the value of the pointer equal to "null" is included in the drawing area data thus generated and then recorded. If such drawing area data exists, the projector 100 specifies the keyword fulfilling a predetermined condition with respect to the drawing area represented by the drawing area data, and makes (step S27) correspondence between the keyword area data of the keyword and the drawing area data with the pointer. As a result of this process, the value of the pointer of the drawing area data is changed from "null" to the value representing the location of the keyword area data. It should be noted that in the case in which the number of the keyword area data is larger than the number of the drawing area data, the projector 100 is not required to execute the process of the step S27.

It should be noted that the condition mentioned here is for determining the correspondence relationship between the drawing area and the keyword. The condition is determined based on the relative position between the drawing area and the keyword area and the number at which the drawing area and the keyword area are recognized. For example, the keyword corresponding to a certain drawing area can be the keyword first recognized after the drawing area has been recognized, or can be the keyword having the shortest distance from the drawing area. Alternatively, if the rule that "the keyword should be written on the left of the corresponding drawing area" is provided in advance, the keyword in the keyword area having the shortest distance from a certain drawing area out of the character strings recognized on a predetermined direction (the left) of the drawing area can be set to the keyword corresponding to the drawing area. It should be noted that the distance mentioned here can be the length of a line segment connecting the center of the drawing area and the center of the keyword area, or can be the shortest distance between these areas.

The recognition process is as described hereinabove. After such a recognition process as described above has been executed, one or more drawing area data and keyword area data are generated and recorded. The projector 100 temporarily stores the drawing area data and the keyword area data as a list, and then reads out the second content using the list to thereby draw the interactive image in the drawing process of the step S3.

Figure 10:
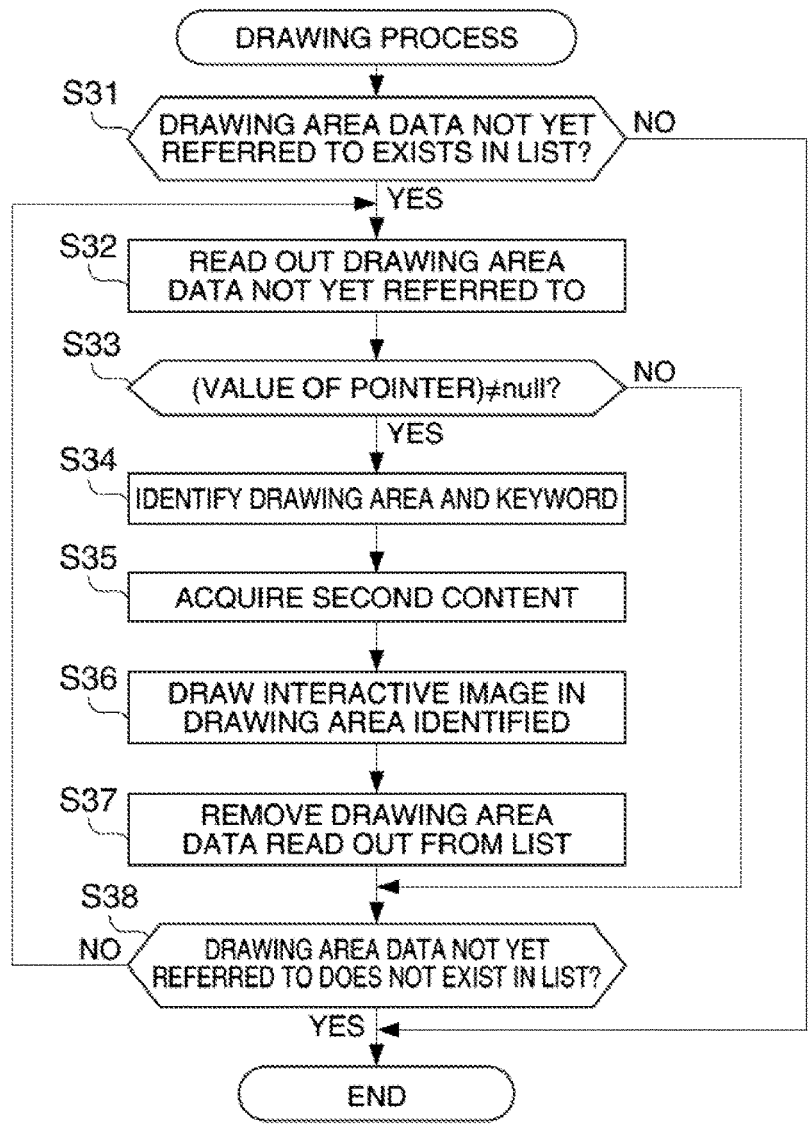
FIG. 10 is a flowchart showing a drawing process.

FIG. 10 is a flowchart showing the drawing process of the step S3. In the drawing process, the projector 100 determines (step S31) whether or not the drawing area data not yet referred to exists in the list of the drawing area data, and if the drawing area data not yet referred to exists, the projector 100 reads out (step S32) one of such drawing area data. Further, if the drawing area data not yet referred to does not exist, the projector 100 terminates the drawing process.

The projector 100 determines (step S33) whether or not the pointer of the drawing area data thus readout indicates "null." In other words, at this moment, the projector 100 determines whether or not the drawing area data read out is linked with the keyword area data. If the value of the pointer is not "null," the projector 100 reads out the keyword area data with reference to the value, and then identifies (step S34) the drawing area and the keyword. Further, the projector 100 identifies the file path of the second content linked with the keyword identified in the step S34 with reference to the content-linking table, and then reads out the second content to thereby acquire the second content (step S35).

Then, the projector 100 draws (step S36) the interactive image represented by the second content acquired in the step S35 in the drawing area identified in the step S34. At this moment, if the size of the drawing area and the size of the interactive image are different from each other, the projector 100 can convert the scale of the interactive image so as to fit into the drawing area to thereby draw it with a different magnification ratio. Further, if the shape (e.g., the aspect ratio) of the drawing area and the shape of the interactive image are different from each other, the projector 100 disposes the interactive image at an appropriate location in the drawing area.

After drawing the interactive image at a predetermined location, the projector 100 removes (step S37) the drawing area data read out in the step S32 from the list. As a result, the number of data in the list of the drawing area data is decremented. Subsequently, the projector 100 determines (step S38) whether or not the drawing area data not yet referred to exists in the list of the drawing area data, and if the drawing area data not yet referred to exists, the projector 100 repeats the processes on and after the step S32. On the other hand, if the drawing area data not yet referred to does not exist, the projector 100 terminates the drawing process.

By executing the recognition process (see FIG. 7) and the drawing process (see FIG. 10) described above, it results that the second contents are sequentially drawn prioritizing those linked with the keywords. Although the data with the pointer having the value of "null" keeps remaining unremoved in the list of the drawing area data, such data is provided to the drawing by generating the keyword area data and linking the keyword area data with such data.

Figure 11:
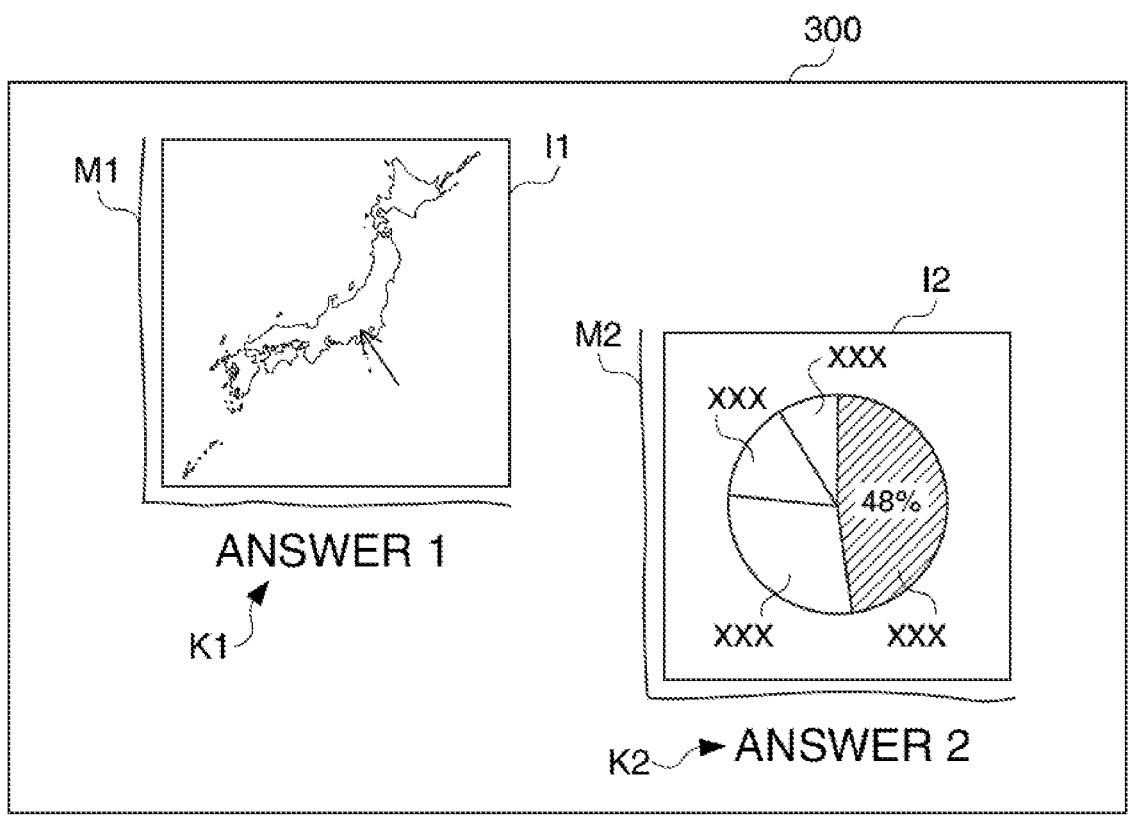
FIG. 11 is a diagram showing a display example of a trajectory by the user and an interactive image.

FIG. 11 is a diagram showing a display example of the trajectory written by the user and the interactive image. In the drawing, the reference symbols M1, M2 respectively denote the positioning marks, and the reference symbols K1, K2 denote the keywords corresponding respectively to the positioning marks M1, M2. Further, the reference symbols I1, I2 denote the interactive images corresponding respectively to the set of the positioning mark M1 and the keyword K1 and the set of the positioning mark M2 and the keyword K2.

As described hereinabove, according to the projection system 10, it is possible to draw the image represented by the content stored in the storage medium 151 due to the operation of writing by the user, and then display the image on the projection surface. It is possible for the user to display the necessary image on the projection surface by the relatively easy operation of writing the positioning mark and the keyword. Therefore, it is possible for the user to display even a precise image or an accurate image difficult to draw by handwriting in relatively short period of time by the writing operation.

Second Embodiment

The present embodiment is particularly preferable in the case in which the interactive image described above is a moving image. The present embodiment is characterized in the point that the reproduction of the interactive image can be controlled. The control of the reproduction mentioned here denotes starting and stopping of the reproduction of the interactive image as a moving image, performing the fast-forwarding and the rewinding, and reproducing the interactive image in slow motion.

It should be noted that the configuration and the operation of the present embodiment have a number of common points with those of the first embodiment. Therefore, in the explanation of the present embodiment described below, the explanation for the part common with the first embodiment will arbitrarily be omitted. Further, in the explanation of the present embodiment, the constituents explained while being denoted with the same reference numerals as in the first embodiment are substantially the same as those of the first embodiment.

Figure 12:
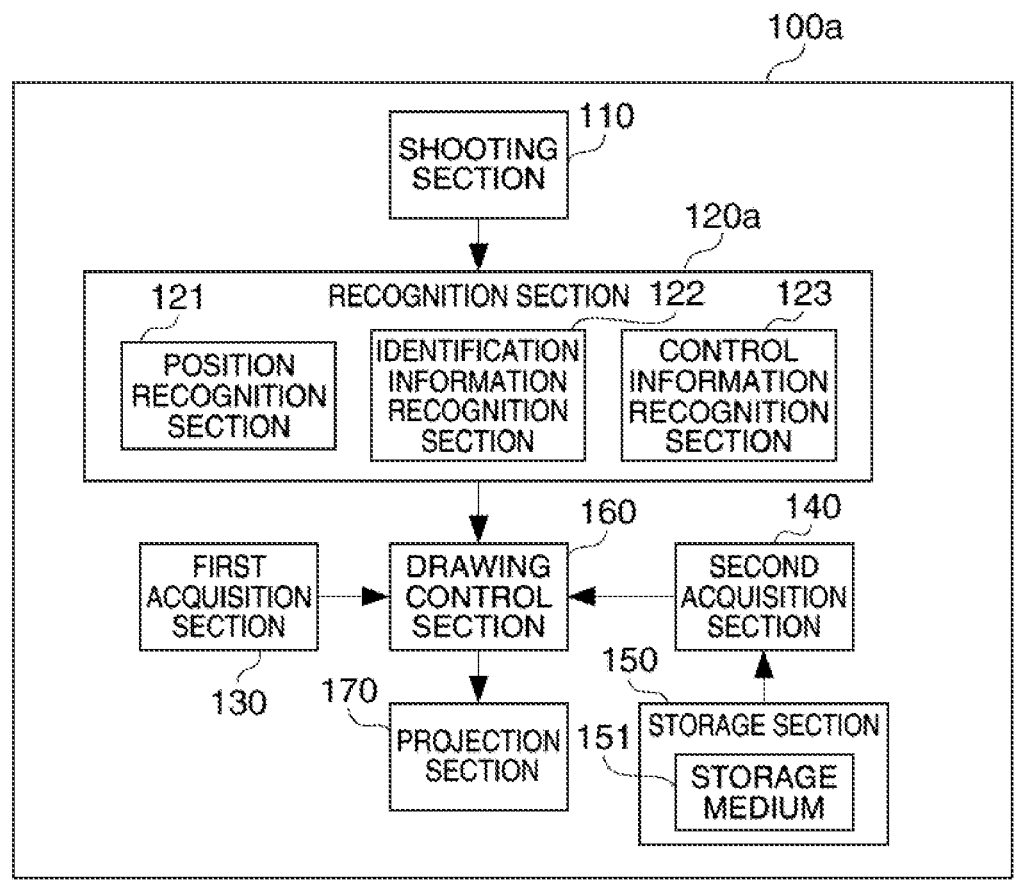
FIG. 12 is a block diagram showing a configuration of a projector.

FIG. 12 is a block diagram showing a configuration of a projector 100*a*. The projector 100*a* is different from the projector 100 according to the first embodiment in the point that a recognition section 120*a* is provided instead of the recognition section 120. The recognition section 120*a* is different from the recognition section 120 in the point that a control information recognition section 123 is provided in addition to the position recognition section 121 and the identification information recognition section 122 substantially the same as those of the first embodiment. It should be noted that the configurations of the whiteboard 300 and the pen 400 are substantially the same as in the first embodiment.

The control information recognition section 123 is a device for recognizing the control information for controlling the reproduction of the interactive image as a moving image based on the trajectory by the pen 400. The control information is the information for representing the reproduction state of the interactive image. The control information includes a plurality of types of information such as the information of instructing the start of the reproduction of the interactive image or the information of instructing stoppage of the reproduction of the interactive image. Such control information is expressed by predetermined diagrams similarly to the positioning mark. The diagrams are hereinafter referred to as "control marks." It should be noted that the control information can also be expressed by symbols (characters) instead of the diagrams.

Figure 13:
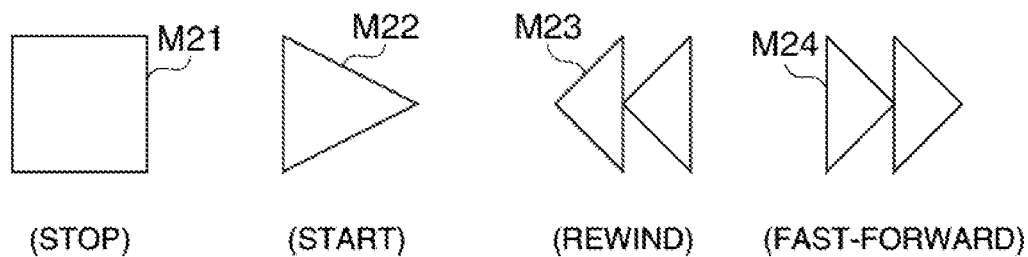
FIG. 13 is a diagram showing an example of control marks.

FIG. 13 is a diagram showing an example of the control marks. The control mark M21 corresponds to the instruction of stopping the reproduction of the interactive image, and the control mark M22 corresponds to the instruction of starting the reproduction of the interactive image. Further, the control mark M23 corresponds to the instruction of rewinding the interactive image having been reproduced, and the control mark M24 corresponds to the instruction of fast-forwarding the interactive image in reproduction.

The projector 100a stores a table having such control marks and the control information linked with each other, and is capable of recognizing the control information from the trajectory of the pen 400 by looking up the table. Although any locations can be adopted as the locations of the control marks in the case of displaying a single moving image on the projection surface, in the case of displaying a plurality of moving images on the projection surface, it is preferable to adopt predetermined locations adjacent to each of the display areas as the locations of the control marks. The linking of the control marks and the interactive images can be realized in substantially the same manner as in the linking of the positioning marks and the interactive images.

As the writing method of the control marks, the following methods can be cited. For example, in the case of starting the reproduction of the interactive image, then halting the reproduction, and then starting the reproduction again, the method of sequentially writing the control marks M22, M21, M22 in this order can be adopted. Alternatively, in the case in which the trajectory of the pen 400 can be erased with an eraser (a whiteboard eraser), there can be adopted the method of validating the control information by writing the control marks and invalidating the control information by erasing the control marks. In the specific example of this method, when additionally writing the control mark M24 in the state in which the control mark M22 has already been written, the reproduction of the interactive image is switched to the fast-forwarding, and when deleting only the control mark M24 in this state, the fast-forwarding is canceled, and the interactive image is reproduced at the original speed.

It should be noted that the control information in the present embodiment is not limited to the example described above, but can be those for controlling, for example, the image quality (e.g., the luminance, the chromaticness, and the contrast) of the interactive image. Further, the control marks M21 through M24 shown in FIG. 13 are only an example, and it is obviously possible to use other diagrams.

Further, a method of drawing the images corresponding to the control marks by the projector 100a instead of writing the control marks by the user can also be adopted in the present embodiment. For example, when the user designates the drawing area, and then writes the character string such as "moving image control" as a keyword, the projector 100a recognizes the keyword, and then draws the images corresponding to the control marks in the drawing area thus recognized. In this case, the user designates the desired mark out of the control marks displayed on the projection surface using the pen 400, and the projector 100a recognizes the location thus designated, and thus it is possible to designate the reproduction state of the interactive image. It should be noted that the control marks in this case can also be for designating the reproduction state of the original image, but not for designating the reproduction state of the interactive image.

Further, in the present embodiment it is also possible to arrange that the second acquisition section 140 is provided with a plurality of input terminals, and the drawing control section 160 makes the image corresponding to the first content input via the input terminals be drawn. The input terminals mentioned here correspond to, for example, the S-terminal, the video graphics array (VGA) terminal, and the high-definition multimedia interface (HDMI) terminal. In other words, the projector 100a in this case is capable of switching the input sources. In this case, when the user designates the drawing area, and writes the character string such as "source switching" as the keyword, the projector 100a draws images (e.g., images for indicating the respective input sources such as "source 1" or "source 2") for switching the input sources in the drawing area thus recognized. In this case, the user designates the desired source out of the sources displayed on the projection surface using the pen 400, and the projector 100a recognizes the location thus designated, and thus it is possible to designate the reproduction state of the original image.

Modified Examples

The invention is not limited to the embodiments described above, but can be put into practice in a variety of forms exemplified below. Further, the invention can also be put into practice in the form of combining a plurality of modified examples described below if necessary.

1. The invention is not required to store the first content and the second content in advance in the projector 100. For example, the projector 100 can have a configuration of being connected to an external device (e.g., a web server, and an image database) so as to be able to communicate with each other, and acquiring the first content and the second content stored in the external device. Further, in this case, it is also possible for the projector 100 to transmit the keyword described above to the external device as the search query, and then receive the second content as the search result.

2. The identification information of the invention is not required to be linked with the file path using the content-linking table as the keyword described above. For example, it is also possible for the identification information to be the file name itself of the content, or to be embedded in the content as the metadata. In the case of using such identification information, the data corresponding to the content-linking table is not necessary.

Further, the identification information of the invention can also be the information representing the color and the shape of the trajectory (i.e., the positioning mark) for designating the drawing area. Therefore, the identification information is not required to be the information of representing the character itself such as the keyword or the file name. Such identification information is the data describing, for example, a rule that a certain content corresponds to the drawing area defined by the red color material while another content corresponds to the drawing area defined by the green color material, or a rule that a certain content corresponds to the drawing area defined by the positioning mark M11 shown in FIG. 3 while another content corresponds to the drawing area defined by the positioning mark M12 shown in FIG. 4. In this case, the identification information recognition section 122 recognizes the identification information based on the color or the shape of the trajectory written by the user, and then determines the correspondence relationship between the drawing area and the content.

It should be noted that the identification information can also be configured so as to include both of the information representing the keyword and the file name, and the information representing the color and the shape of the positioning mark, and to uniquely identify the content using the combination of the information.

Further, the identification information is not necessary in the case in which the interactive image to be drawn on the projection surface is a single specific image, or in the case of drawing a predetermined plurality of interactive images on the projection surface in a predetermined order. In this case, the user is only required to designate the drawing area by a writing operation, and is not required to designate the image to be drawn.

3. It is also possible for the drawing control section 160 to perform the control of updating the interactive image in the case in which the trajectory recognized by the recognition section 120 has made a change fulfilling a predetermined condition. The trajectory mentioned here can be either of the trajectory corresponding to the keyword and the trajectory corresponding to the positioning mark. Further, the condition mentioned here corresponds to, for example, deletion of the trajectory, or rewriting of the trajectory.

For example, it is also possible to arrange that when either one of the trajectory corresponding to the keyword and the trajectory corresponding to the positioning mark is deleted, the drawing control section 160 deletes the interactive image corresponding thereto. Alternatively, in the case of extending the straight line of the positioning mark M11 (see FIG. 3) by adding the line segment, it is also possible for the drawing control section 160 to enlarge the drawing area, and change the scale of the interactive image in accordance with the size of the drawing area, and redraw (i.e., enlarge) the interactive image. Similarly, in the case of contracting the straight line of the positioning mark M11 (see FIG. 3) by erasing a part of the line, it is also possible for the drawing control section 160 to contract the drawing area, and change the scale of the interactive image in accordance with the size of the drawing area, and redraw (i.e., contract) the interactive image.

4. The projection surface is not required to be the whiteboard, but can also be a screen or a paper sheet. Further, the pen used for writing the trajectory is not required to make the color material be attached to the projection surface, but can also be a device for emitting the visible light beam such as a red light beam or an infrared beam on the projection surface. Such a pen can be arranged to be able to change the wavelength of the light emitted therefrom in accordance with the operation by the user, or include a plurality of pens different from each other in wavelength of light to be emitted therefrom. In this case, the projector 100 has sensitivity to the wavelength of the light emitted by the pen, and recognizes the trajectory of the symbol based on the light thus emitted. Although it is desirable for the projector 100 to draw the trajectory on the projection surface, the drawing of the trajectory is not essential.

Alternatively, it is also possible for the invention to have a configuration of providing a detection section for detecting the location of the pen (or the pen tip) to the projection surface, and recognizing the trajectory based on the location thus detected. Such a detection section is, for example, a sensor for detecting the pressure (writing pressure) against the projection surface, or a sensor for optically detecting the location of the pen tip.

5. The keyword of the invention can be configured to include a predetermined distinguishing symbol in order to make the discrimination from the positioning marks, the control marks, and the symbols other than the keyword clearer. For example, it is also possible to arrange that the keyword of the invention is provided with "* (asterisk)" at the front and the end to form the character strings of "*answer 1*" and "*answer 2*." According to this configuration, it is possible to correctly recognize the keyword even in the case in which the user writes a variety of characters other than the keywords on the projection surface.

6. The recognition process and the drawing process described above can also be realized by the cooperation between the projector and another device instead of the operation of the projector alone.

Figure 14:
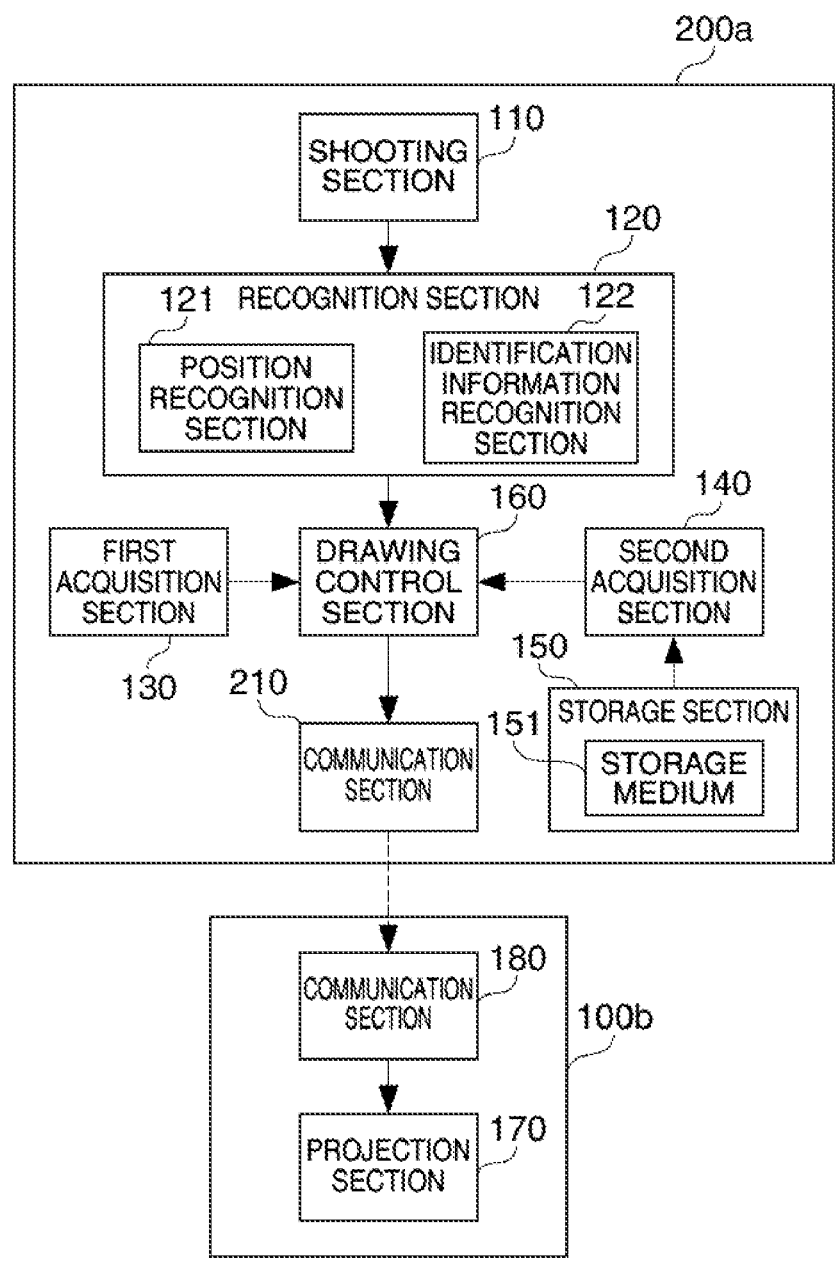
FIG. 14 is a block diagram showing a configuration of a projector and an information processing device.

FIG. 14 is a block diagram showing a configuration of the present modified example. In the drawing, the constituents denoted with the same reference numerals as in FIG. 2 are substantially the same as in the first embodiment. In the present example, a reference symbol 100b denotes the projector, and a reference symbol 200a denotes the information processing device.

The information processing device 200a is, for example, a personal computer, a mobile phone, or a smartphone. The information processing device 200a is provided with a communication section 210 for communicating with the projector 100b as an external device in addition to the shooting section 110, the recognition section 120, the first acquisition section 130, the second acquisition section 140, the storage section 150, and the drawing control section 160. Further, the projector 100b is provided with a communication section 180 for communicating with the information processing device 200a in addition to the projection section 170. The information processing device 200a transmits the image signal via the communication section 210, and the projector 100b receives the image signal via the communication section 180. It should be noted that the first acquisition section 130 is capable of acquiring the first content or the second content via a network such as the Internet, and acquiring the first content or the second content stored in the storage section 150.

It should be noted that the storage medium 151 can also be a removable storage medium detachably attached to the information processing device 200a, such as a so-called universal serial bus (USB) memory or a digital versatile disc (DVD). In this case, the information processing device 200a is only required to be provided with a device (e.g., a USB port or a DVD drive) for retrieving the data from the storage medium 151 instead of the storage section 150. Further, it is also possible for the storage medium 151 to store not only the second content but also the first content. It should be noted that the fact that the storage medium 151 can also be detachably attached can also be applied to the first embodiment and the second embodiment in substantially the same manner.

7. It is also possible for the projector according to the invention to fail to have the shooting function. Specifically, the projection system according to the invention can have a configuration separately provided with a digital camera (a digital still camera, or a digital video camera).

Figure 15:
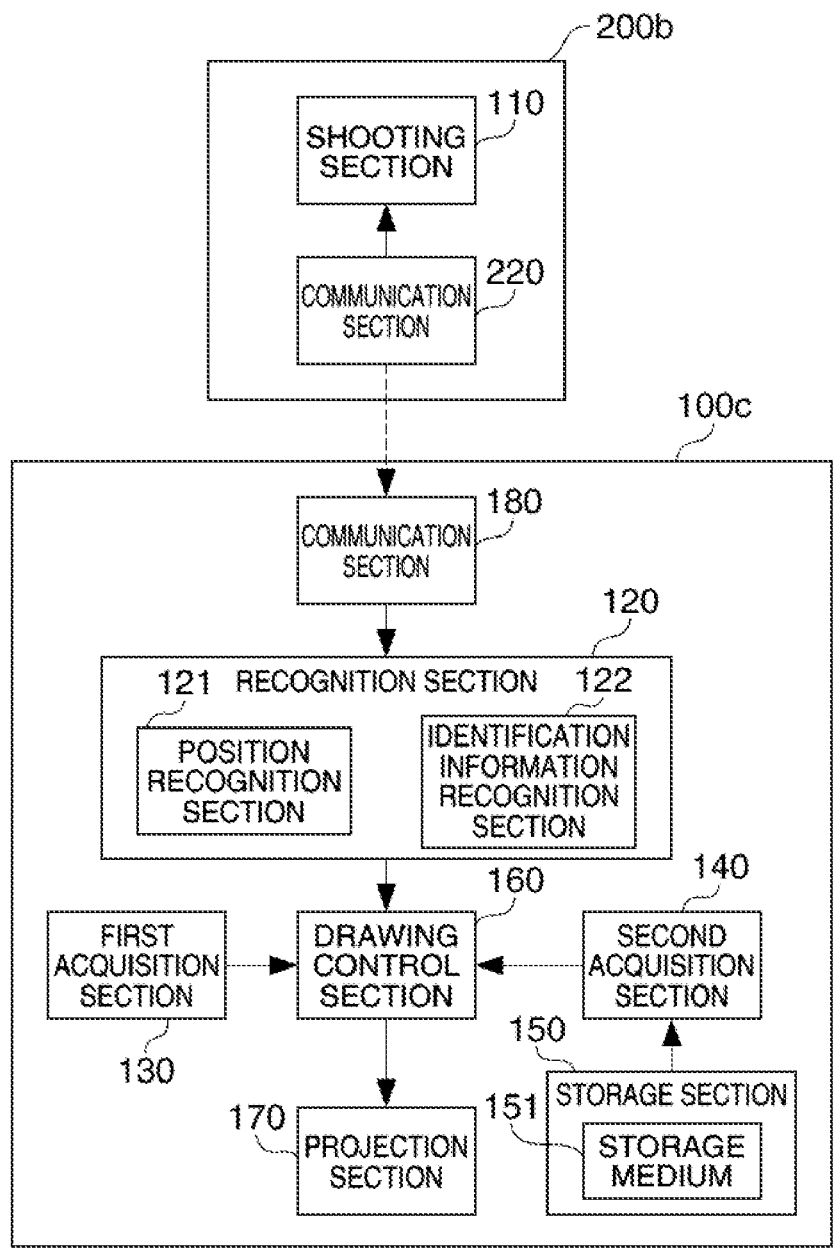
FIG. 15 is a block diagram showing a configuration of a projector and a digital camera.

FIG. 15 is a block diagram showing a configuration of the present modified example. In the drawing, the constituents denoted with the same reference numerals as in FIG. 2 or FIG. 14 are substantially the same as in the first embodiment. In the present example, a reference symbol 100c denotes the projector, and a reference symbol 200b denotes the digital camera.

The digital camera 200b is provided with the shooting section 110, and a communication section 220 for communicating with the projector 100c as the external device. Further, the projector 100c is provided with the communication section 180 of the sixth modified example instead of the shooting section 110 in the configuration of the projector 100 according to the first embodiment. The digital camera 200b and the projector 100c transmit and receive the image data via the communication sections 220, 180. It should be noted that the communication by the communication sections 220, 180 can be either one of the wireless communication and the wired communication.

Further, the projection system according to the invention can have the digital camera 200b according to the present modified example and the information processing device 200a according to the sixth modified example configured integrally with each other. In other words, the invention can have the configuration provided with the projector having no shooting function and the information processing device having the shooting function and capable of executing the recognition process and the drawing process. Such an information processing device as described above corresponds to, for example, a smart phone provided with the shooting function, or a so-called tablet personal computer (PC).

The entire disclosure of Japanese Patent Application No. 2011-225605, filed Oct. 13, 2011 is expressly incorporated by reference herein.

What is claimed is:

1. A projector comprising:
a position recognition section adapted to recognize a drawing area in which an image is to be drawn based on a first trajectory of a first symbol, the drawing area being designated in a projection surface and the drawing area being a partial area of a projected image projected on the projection surface;
an identification information recognition section adapted to recognize, based on a second trajectory of a second symbol, identification information linked with image data representing the image;
a storage section adapted to store a table describing correspondence between identification information and image data;
an acquisition section adapted to acquire the image data representing the image based on the identification information and the table stored in the storage section; and
a drawing control section adapted to perform control so that the image represented by the image data is drawn in the drawing area of the projection surface,
wherein
the drawing control section performs control so that the second symbol and the image represented by the image data are displayed concurrently, and
the drawing area is defined when a user writes a predetermined trajectory as the first trajectory, the predetermined trajectory defining at least one substantially horizontal boundary and at least one substantially vertical boundary of the drawing area on the projection surface, and the at least one substantially horizontal boundary and the at least one substantially vertical boundary together defining the partial area of the projected image projected on the projection surface.

2. The projector according to claim 1, wherein
the acquisition section acquires the image data and identification information linked with the image data, and
the drawing control section makes the image, which is represented by the image data linked with the identification information recognized by the identification information recognition section, be drawn in the drawing area of the projection surface recognized by the position recognition section.

3. The projector according to claim 1, wherein
the identification information recognition section determines whether or not the second symbol is included in the second trajectory to thereby recognize the identification information.

4. The projector according to claim 1, wherein
the position recognition section recognizes a plurality of drawing areas,
the identification information recognition section recognizes a plurality of pieces of identification information, and
the drawing control section determines a correspondence relationship between the drawing area and the identification information based on one of positions of the drawing area and the identification information, and a number at which the drawing area and the identification information are recognized.

5. The projector according to claim 1, wherein
the identification information includes information representing one of a color and a shape of the first trajectory adapted to designate the drawing area, and
the identification information recognition section recognizes the identification information based on the one of the color and the shape of the first trajectory.

6. The projector according to claim 1 further comprising:
a control information recognition section adapted to recognize control information, which is used for controlling reproduction of the image, based on the second trajectory, wherein the drawing control section controls the reproduction of the image with the control information recognized by the control information recognition section.

7. The projector according to claim 1, wherein
the drawing control section updates the image if a change in the second trajectory fulfills a predetermined condition.

8. An image drawing method comprising:
recognizing a drawing area in which an image is to be drawn based on a first trajectory of a first symbol, the drawing area being designated in a projection surface and the drawing area being a partial area of a projected image projected on the projection surface;
recognizing, based on a second trajectory of a second symbol, identification information linked with image data representing the image;
acquiring the image data representing the image based on the identification information and a stored table that describes correspondence between identification information and image data; and
drawing the image, which is represented by the image data, in the drawing area on the projection surface, wherein
- the second symbol and the image represented by the image data are displayed concurrently, and
- the drawing area is defined when a user writes a predetermined trajectory as the first trajectory, the predetermined trajectory defining at least one substantially horizontal boundary and at least one substantially vertical boundary of the drawing area on the projection surface, and the at least one substantially horizontal boundary and the at least one substantially vertical boundary together defining the partial area of the projected image projected on the projection surface.

9. The projector according to claim 1, wherein
the identification information includes a predetermined color that is associated with the image data, and
the user selects the image to be drawn in the drawing area by writing, on the projection surface, the first trajectory of the first symbol, which defines boundaries of the drawing area, in the predetermined color associated with the image data.

10. The projector according to claim 1, wherein
the image represented by the image data is drawn inside the drawing area defined by the at least one substantially horizontal boundary and the at least one substantially vertical boundary based on identification information linked with image data representing the image indicated by the second trajectory of the second symbol which the user draws outside of the drawing area defined by the at least one substantially horizontal boundary and the at least one substantially vertical boundary.

* * * * *